United States Patent [19]

Pittinger, Sr. et al.

[11] Patent Number: 4,561,180

[45] Date of Patent: Dec. 31, 1985

[54] APPARATUS FOR CUTTING VEGETATION WITH INCREMENTAL FEEDING OF CUTTING FILAMENT

[76] Inventors: Charles B. Pittinger, Sr.; Cynthia A. Pittinger, both of 902 North Lake Dr., Weatherford, Tex. 76086; Charles B. Pittinger, Jr., 320 Cockeys Mill Rd., Reisterstown, Md. 21136

[21] Appl. No.: 626,218

[22] Filed: Jun. 29, 1984

[51] Int. Cl.$^4$ .......................................... A01D 35/26
[52] U.S. Cl. ................................................... 30/276
[58] Field of Search ................... 30/276, 347; 56/12.7, 56/295; 51/335

[56] References Cited

U.S. PATENT DOCUMENTS

| | | | |
|---|---|---|---|
| 3,928,911 | 12/1975 | Pittinger | 30/276 |
| 4,007,525 | 2/1977 | Utter | 30/276 |
| 4,047,455 | 9/1977 | Pittinger | 76/82.1 |
| 4,077,191 | 3/1978 | Pittinger et al. | 56/12.7 |
| 4,097,991 | 7/1978 | Proulx | 30/276 |
| 4,118,864 | 10/1978 | Pittinger et al. | 30/276 |
| 4,134,204 | 1/1979 | Perdue | 30/276 |
| 4,136,446 | 1/1979 | Tripp | 30/276 |
| 4,137,694 | 2/1979 | Hopper | 56/12.7 |
| 4,138,810 | 2/1979 | Pittinger | 30/276 |
| 4,145,809 | 3/1979 | Proulx | 30/276 |
| 4,152,832 | 5/1979 | Akaike et al. | 30/276 |
| 4,161,820 | 7/1979 | Moore | 30/276 |
| 4,169,311 | 10/1979 | Evenson et al. | 30/276 |
| 4,176,508 | 12/1979 | Baumann et al. | 56/12.7 |
| 4,177,561 | 12/1979 | Ballas | 30/276 |
| 4,183,138 | 1/1980 | Mitchell et al. | 30/276 |
| 4,185,380 | 1/1980 | Hindman, Jr. | 30/347 |
| 4,185,381 | 1/1980 | Palmieri et al. | 30/347 |
| 4,203,212 | 5/1980 | Proulx | 30/276 |
| 4,209,902 | 7/1980 | Moore et al. | 30/276 |
| 4,235,068 | 11/1980 | Comer | 56/12.7 |
| 4,236,309 | 12/1980 | Cayou | 30/276 |
| 4,250,623 | 2/1981 | Pittinger et al. | 30/347 |
| 4,259,782 | 4/1981 | Proulz | 30/276 |
| 4,274,201 | 6/1981 | Oberg et al | 30/276 |
| 4,281,505 | 8/1981 | Fuelling et al. | 56/12.7 |
| 4,310,970 | 1/1982 | Evenson et al. | 30/276 |

Primary Examiner—Douglas D. Watts
Attorney, Agent, or Firm—Munson H. Lane, Jr.

[57] ABSTRACT

A vegetation cutting apparatus of the filament type comprising a cutter head including a spindle adapted to be rotatably driven, a keyway in the spindle extending axially of the spindle, and a key member carried by the spindle and slidably movable in the keyway. A clutch means is coaxially mounted on the spindle, and a filament storage spool is mounted on the spindle, the spool being carried by and lying radially outwardly of the clutch means, whereby the clutch means and the spool rotatably move as a unit. A spring means normally biases the key member into driving relation with the clutch means whereby normally the spindle rotatably drives the clutch means through the key member to rotatably drive the spool. A means such as a ground contact plunger operatively related to the key member, or, alternatively, an operating rod operatively related to the key member and actuated by a cable or the like, imparts axial movement to the key member along the keyway against the spring means to move the key member out of driving relation to the clutch means to permit relative rotation between the spool and the spindle and thus to permit an increment of the filament to be fed by centrifugal force from the spool.

32 Claims, 25 Drawing Figures

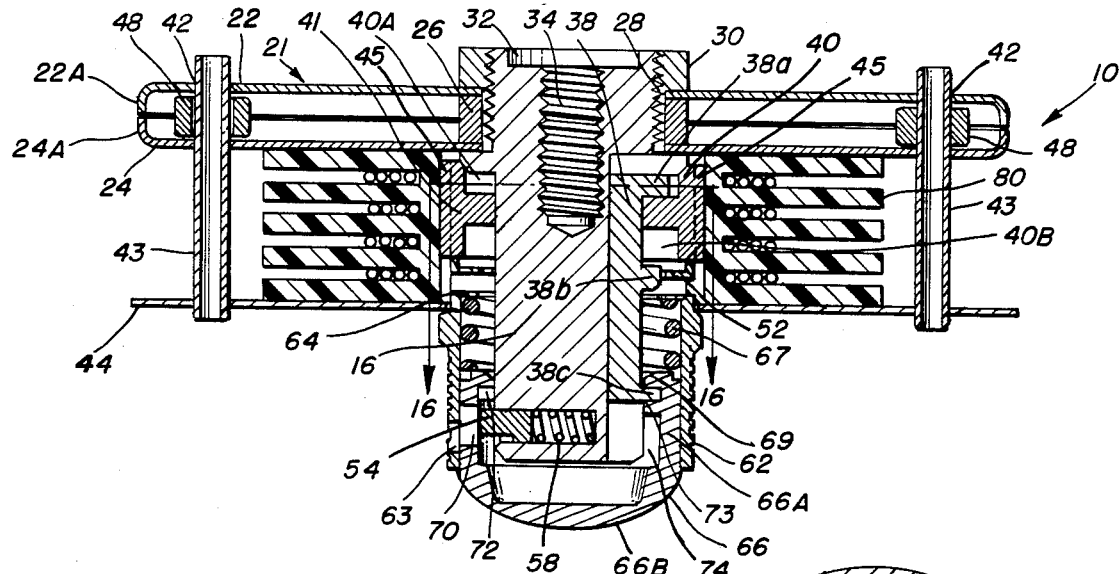
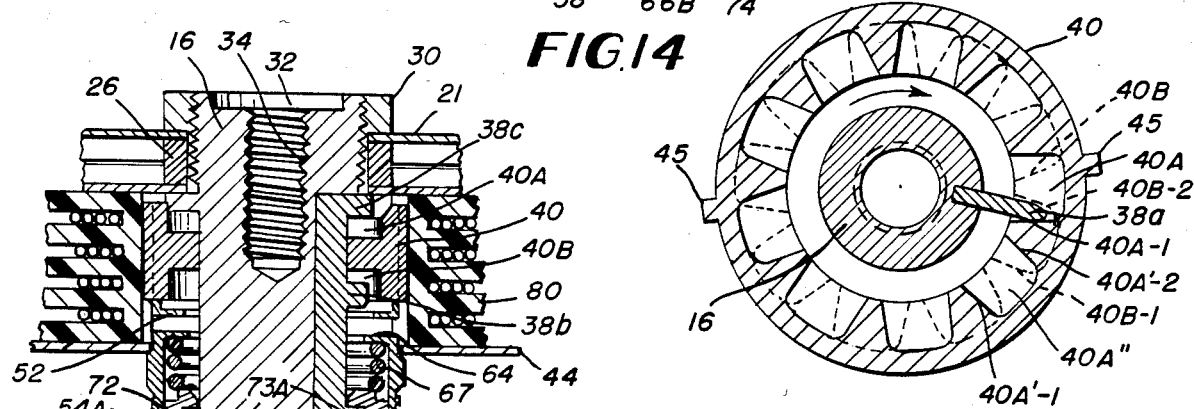
FIG.14
FIG.16
FIG.15
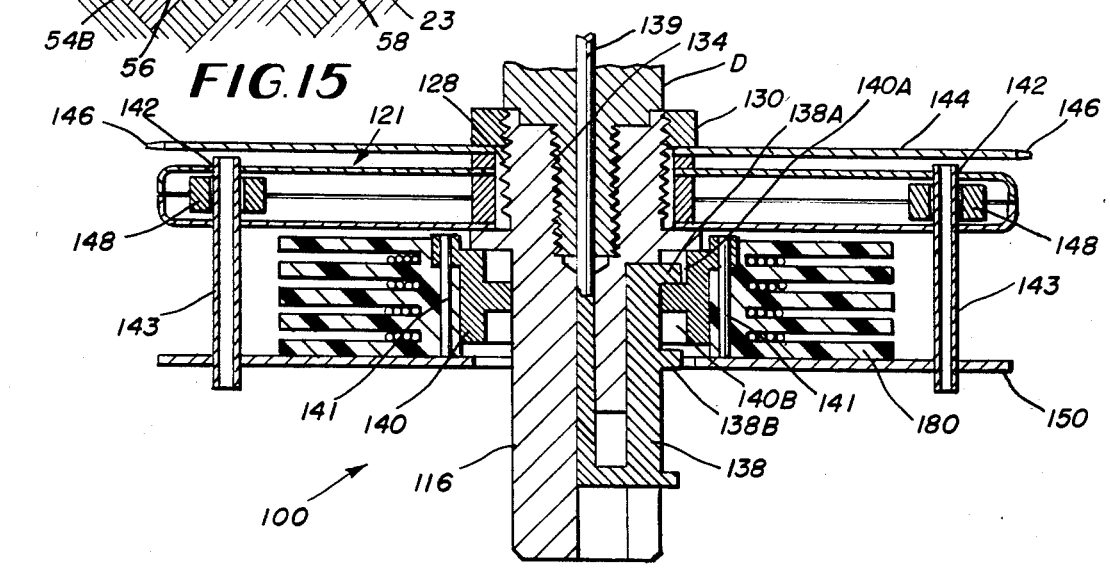
FIG.17

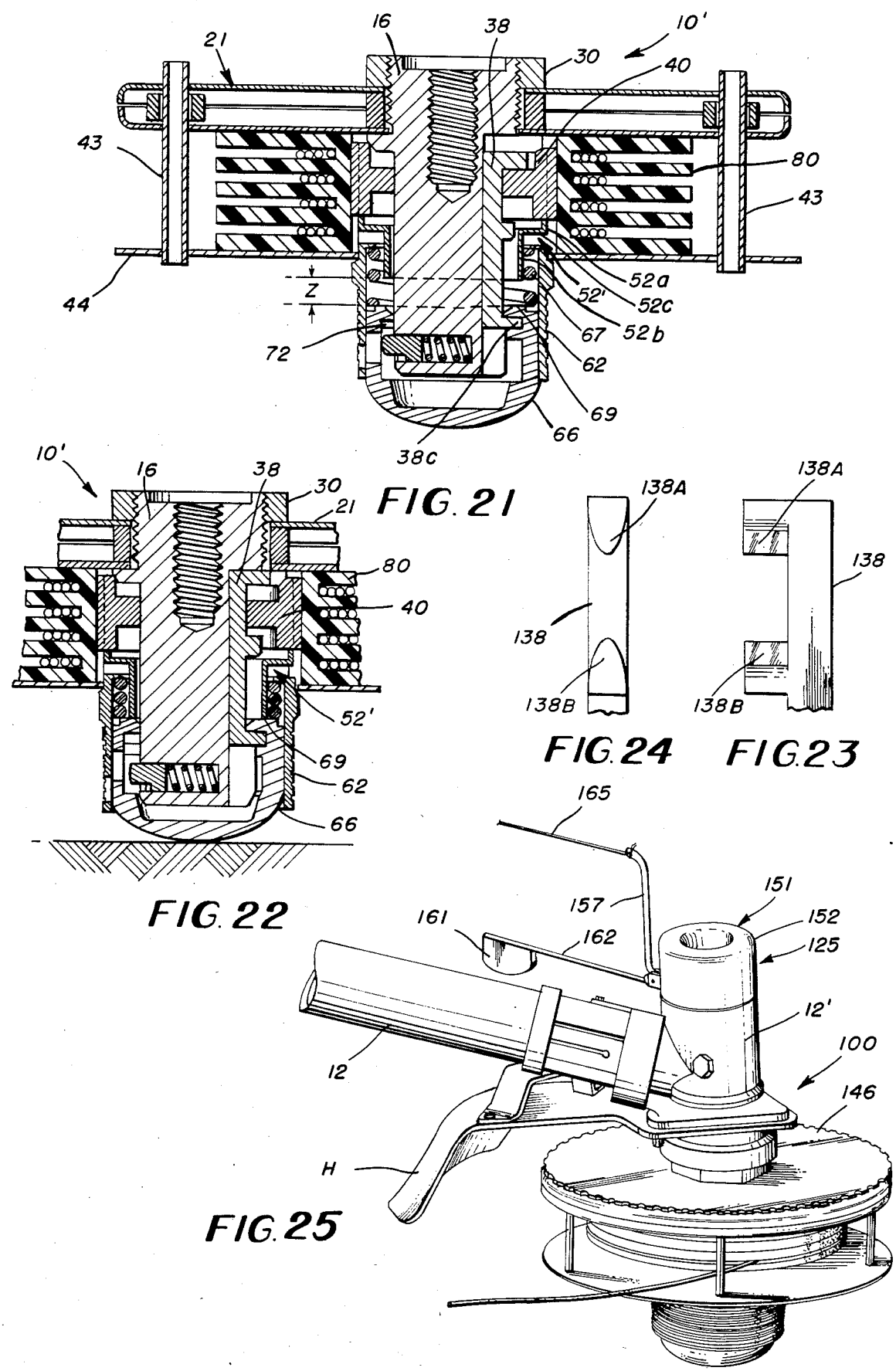

APPARATUS FOR CUTTING VEGETATION WITH INCREMENTAL FEEDING OF CUTTING FILAMENT

FIELD OF THE INVENTION

This invention relates to an apparatus for cutting vegetation such as weeds, grass, or the like by means of a flexible, filamentous cutting line or flail extending from a rotating head, and more particularly to an apparatus of this type having an improved arrangement for providing additional increments of the flexible cutting filament to compensate for end portions of the filament which break off due to wear or for other reasons.

DESCRIPTION OF THE PRIOR ART

Rotary weed cutters utilizing a filament type cutting element are well known in the art. Such filament-type weed and/or grass cutters usually utilize a monofilament plastic line which may be formed of nylon or the like and which is wound onto a spool rotated by a rotary drive. The filament carried by the spool includes a free traveling end which extends outwardly from the spool for a few inches and cuts vegetation in its path when the rotary cutter head is rotated at a relatively high speed. Examples of filament-type apparatus for cutting vegetation such as weeds or the like are shown by the following U.S. patents:

U.S. Pat. No. 3,928,911 Pittinger
U.S. Pat. No. 4,007,525 Utter
U.S. Pat. No. 4,077,191 Pittinger Sr. et al
U.S. Pat. No. 4,097,991 Proulx
U.S. Pat. No. 4,118,864 Pittinger Sr. et al
U.S. Pat. No. 4,134,204 Perdue
U.S. Pat. No. 4,136,446 Tripp
U.S. Pat. No. 4,137,694 Hopper
U.S. Pat. No. 4,138,810 Pittinger
U.S. Pat. No. 4,145,809 Proulx
U.S. Pat. No. 4,152,832 Akaike et al
U.S. Pat. No. 4,169,311 Evenson et al
U.S. Pat. No. 4,176,508 Baumann et al
U.S. Pat. No. 4,177,561 Ballas
U.S. Pat. No. 4,185,380 Hindman, Jr.
U.S. Pat. No. 4,185,381 Palmieri et al
U.S. Pat. No. 4,209,902 Moore et al
U.S. Pat. No. 4,235,068 Comer
U.S. Pat. No. 4,250,623 Pittinger et al
U.S. Pat. No. 4,281,505 Fuelling et al.

The following U.S. patents show filament-type cutting apparatus for cutting vegetation such as weeds or the like in which a plunger member or the like carried by the rotating cutting head is bumped against the ground surface to cause a declutching operation relative to the rotating cutting head of the spool on which the filament is wound, whereby to deploy or pay out an additional increment of the cutting filament:

U.S. Pat. No. 4,161,820 Moore
U.S. Pat. No. 4,183,138 Mitchell et al
U.S. Pat. No. 4,203,212 Proulx
U.S. Pat. No. 4,236,309 Cayou
U.S. Pat. No. 4,259,782 Proulx
U.S. Pat. No. 4,274,201 Oberg et al U.S. Pat. No. 4,209,902, Moore et al, shows an arrangement for incrementally feeding a cutting filament in which the incrementing feed of the filament is initiated by a lever member actuated by a control cable.

SUMMARY OF THE INVENTION

Accordingly, it is an object of the present invention to provide in a vegetation cutting apparatus of the filament type a clutch arrangement for providing an incremental feed of the cutting filament when required, including a sliding key which is movable to cause the filament spool to be momentarily disconnected or declutched in rotational increments from the prime mover, whereby to permit incremental feeding of the cutting filament by centrifugal force.

It is a further object of the invention to provide a vegetation cutting apparatus including a sliding key clutch which provides incremental positive rotational stepping of the filament spool with no impact from a rotational ground coupling such as a ground contact plunger.

It is a further object of the invention to provide an incremental filament feed arrangement in an apparatus for cutting vegetation of the filament type in which the ground contact plunger which is used to initiate the incremental feeding of the filament is so related to the other components of the apparatus that it does not impart any rotational forces to the sliding key clutch or to the filament spool which form part of the vegetation cutting apparatus.

It is still a further object to provide a vegetation cutting apparatus of the filament type in which the centrifugal pulling forces on the filament which is wound on the filament spool is the only force which rotates and advances the spool and the clutch wheel associated with the filament spool relative to the cutting head, to thereby minimize the destructive forces on the incremental feeding mechanism.

It is a further object of the invention to provide a vegetation cutting apparatus of the filament type including a ground contact plunger for initiating the incremental feeding of the filament and in which all excess ramming or rotational impact forces are isolated at and within the ground contact plunger regardless of the severity of the ground impact.

It is a further object of the invention to provide a vegetation cutting apparatus of the filament type which can be quickly disassembled and reassembled to permit replacement of the cover plate and the filament spool when required.

It is a further object of the invention to provide a vegetation cutting apparatus of the filament type which includes a flexible cord-like filament which cuts weeds and light vegetation with a flail-like action and in which the cutting apparatus additionally includes a cover plate having saw teeth on the outer periphery thereof for the purpose of cutting heavy growth of vegetation such as, for example, one-half inch tree off-shoots, with a sawing action.

It is still a further object of the invention to provide a vegetation cutting apparatus of the filament type which includes means for damping vibrations which occur, particularly if the apparatus should vibrate at or pass through the resonant or natural vibrating frequency of the rotating mass of the cutting apparatus.

It is still a further object of the invention to provide a vegetation cutting apparatus of the rotating filament type including a ground contact plunger and a spring member biasing the ground contact plunger in a downward direction, and a cover plate which serves as a seat for the normally lower end of the spool on which the filament is wound, the spring member which biases the ground contact plunger in a downward direction also serving to exert a constant pressure against the cover plate and against the end surfaces of the filament spool, whereby to provide a dirt and mud seal while providing rotational friction to the spool and becoming a rotational shock absorber to the spool, to the clutch wheel which is keyed to the spool, and to the clutch key which establishes the driving connection between the clutch wheel and the drive spindle.

BRIEF SUMMARY OF THE INVENTION

In achievement of these objectives, there is provided in accordance with embodiments of the invention a vegetation cutting apparurus of the filament type comprising a cutter head including a spindle adapted to be rotatably driven, a keyway in said spindle extending axially of said spindle, a key member carried by said spindle and slidably movable in said keyway, a clutch means coaxially mounted on said spindle, a spool mounted on said spindle for storing the filament, said spool being carried by and lying radially outwardly of said clutch means, whereby said clutch means and said spool rotatably move as a unit, means normally biasing said key member into driving engagement with said clutch means whereby normally said spindle rotatably drives said clutch means through said key member to thereby rotatably drive said spool, means for imparting axial movement to said key member along said keyway against said biasing means whereby to move said key member out of driving relation with respect to said clutch means, and thus whereby to transitorily interrupt the rotatable drive connection from said spindle to said spool through said clutch means, whereby to permit relative rotation between said spool and said spindle, and thus whereby to permit an increment of said filament to be fed by centrifugal force from said spool. The means for imparting axial movement to said key member may be a ground contact plunger carried by the normally lower end of the cutter head and operatively related to the key member whereby to impart axial movement to the key member. Alternatively, the means for imparting axial movement to the key member may be an operating rod operatively related to the key member and adapted to be actuated by a cable or the like to axially move the key member.

Further objects and advantages of the invention will become apparent from the following description taken in conjunction with the accompanying drawings, in which:

BRIEF DESCRIPTION OF THE DRAWINGS

FIG. 14 is a view taken in section along line 14—14 of FIG. 4 of the preferred embodiment, showing the ground engaging plunger in its fully extended outward position;

FIG. 15 is a fragmentary view in cross section similar to FIG. 14 along line 14—14 of FIG. 4 showing the effect of the ground-engaging plunger being struck or bumped on the ground surface causing the sliding key to move into a different clutch cavity;

FIG. 16 is a view in horizontal section taken along line 16—16 of FIG. 14 showing how the upper and lower clutch cavities are positioned with respect to each other; and further showing the position of the sliding key in driving engagement with the upper clutch cavity before the ground contact plunger is "bumped" or struck against the ground, at which time the sliding key will move into driving engagement with the lower clutch cavity;

FIG. 17 is a view of an alternative embodiment along a cross section similar to those used in FIGS. 14 and 15, in which the movement of the sliding key is obtained by movement of a cable member or the like which is connected to the sliding key;

FIG. 21 is a sectional view similar to FIG. 14 but showing the cutter head with a modified clutch retainer ring;

FIG. 22 is like FIG. 15 but showing the cutter head with the modified clutch retainer ring of FIG. 21;

FIG. 23 is an enlarged partial side elevational view of the clutch key included in the embodiment of FIG. 17 showing the curved surfaces of the upper and lower clutch key elements;

FIG. 24 is an end view of the clutch key shown in FIG. 23.

FIG. 25 is a perspective view similar to FIG. 2 but showing the cutter head of FIGS. 17 and 18 substituted for the cutter head of FIG. 2 and further showing the clutch key operating mechanism of FIG. 19 mounted on top of drive shaft housing 12'.

DESCRIPTION OF THE PREFERRED EMBODIMENT

Figure 1:
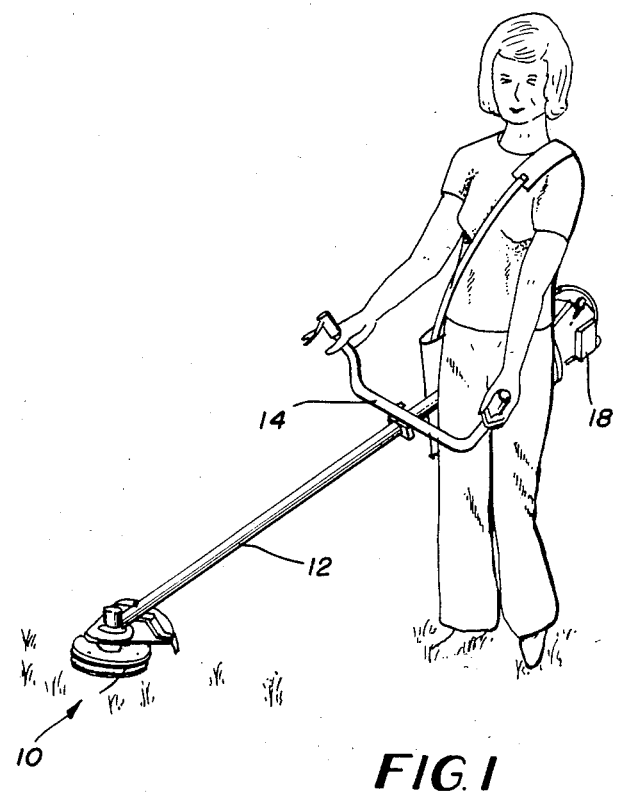
FIG. 1 is a view in perspective of the vegetation cutting apparatus of the invention in operation.

As seen in FIG. 1, the filament type rotary cutter head generally indicated at 10 may be supported from a hollow tube member 12 connected at its upper end to a handle 14 which is held by the operator. A flexible drive shaft may pass through hollow tube 12 and may be connected to the drive spindle 16 of the rotary cutter as will be explained in more detail hereinafter. The opposite end of the flexible shaft is connected to the output of a suitable prime mover such as, for example, a small gasoline engine 18 mounted on the back of the operator.

Cutter head 10 comprises a centrally located spindle 16 which is provided intermediate the height thereof, but substantially closer to the upper end of the spindle than to the lower end thereof, with a circular flange 19.

The cutter head includes a hollow cap member generally indicated at 21 comprising an upper disc 22 provided with a downwardly extending annular flange 22A around its outer periphery; and a lower disc 24 provided with an upwardly extending annular flange 24A around its outer periphery. The two annular flanges 22A and 24A of the respective discs 22 and 24 are in mating abutting relation to each other to circumferentially bound the hollow interior of cap 21. Each of the respective discs 22 and 24 is provided with a corresponding centrally located aperture, and a central hub member 26 lying within hollow cap 21 extends in circumferentially bounding relation to the respective apertures of the two discs 22 and 24, hub member 26 extending in an axial direction between the lower surface of upper disc member 22 and the upper surface of lower disc member 24, with respect to the views shown in FIGS. 14 and 15.

Hollow cap member 21 is coaxially positioned about the upper portion of spindle 16, with the lower surface of lower disc 24 seating of the upper surface of flange 19 on spindle 16. The portion of spindle 16 lying above flange 19 of the spindle is externally threaded as indicated at 28, and an internally threaded nut 30 is secured on threaded portion of spindle 16 which projects above the upper surface of the upper disc member 24, whereby to secure cap 21 in assembled relation with respect to the upper end of spindle 16.

The upper end of spindle 16 is provided with a countersunk recess 32 in the face thereof, and a screw-threaded passage 34 extends downwardly from the lower end of countersunk opening 32. A suitable screw-threaded member D carried by a flexible drive shaft (not shown) may be engaged with screw-threaded passage 34 in the upper end of spindle 16 whereby to permit driving of spindle 16, and hence, of cutter head 10 by means of a suitable prime mover such as a gasoline engine or the like.

The entire portion of the height of spindle 16 which lies beneath hollow cap 21 including circular flange 19 of spindle 16 is provided with an axially extending recess or slot 23 extending radially inwardly from the outer peripheral surface of spindle 16 and of flange 19 and which defines a keyway to receive a slidably movable key 38 to be described in more detail, which cooperates with a clutch wheel 40, also to be described, to permit placing filament spool 80, to be described, selectively into or out of driven relation with respect to spindle 16.

Each of the respective discs 22, 24 of hollow cap member 21 is provided with four equally circumferentially spaced apertures each indicated at 42 which may be spaced at 90° intervals around the periphery of cap member 21, the apertures 42 being located contiguous but spaced radially inwardly a short distance of the outer periphery of cap member 21. Corresponding apertures 42 of the respective axially spaced discs 22, 24 are in vertical alignment with each other.

A corresponding post 43 is press fitted in each set of aligned upper and lower apertures in the respective upper and lower discs 22 and 24 of cap member 21. The upper ends of the respective posts 43 project a short distance above the upper surface of upper disc. 22. The major portion of the height of the respective posts 43 extends beneath lower disc 24, and a cover plate 44 to be described is mounted on the lower ends of the posts 43.

Figure 2:
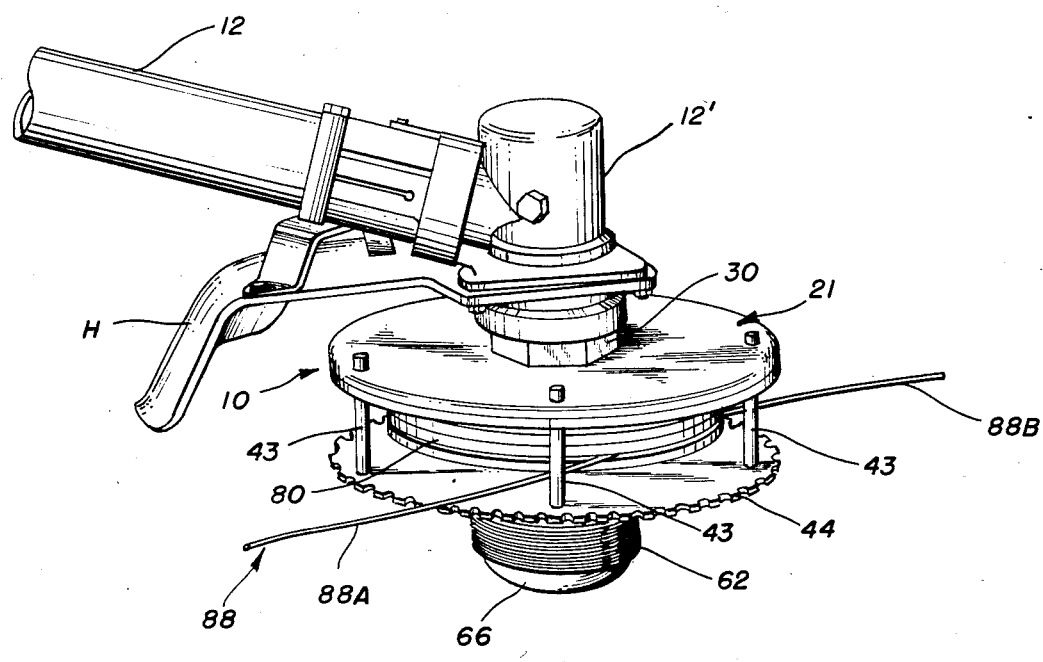
FIG. 2 is a view in perspective showing how the apparatus of FIG. 1 may be attached to a drive mechanism.
Figure 4:
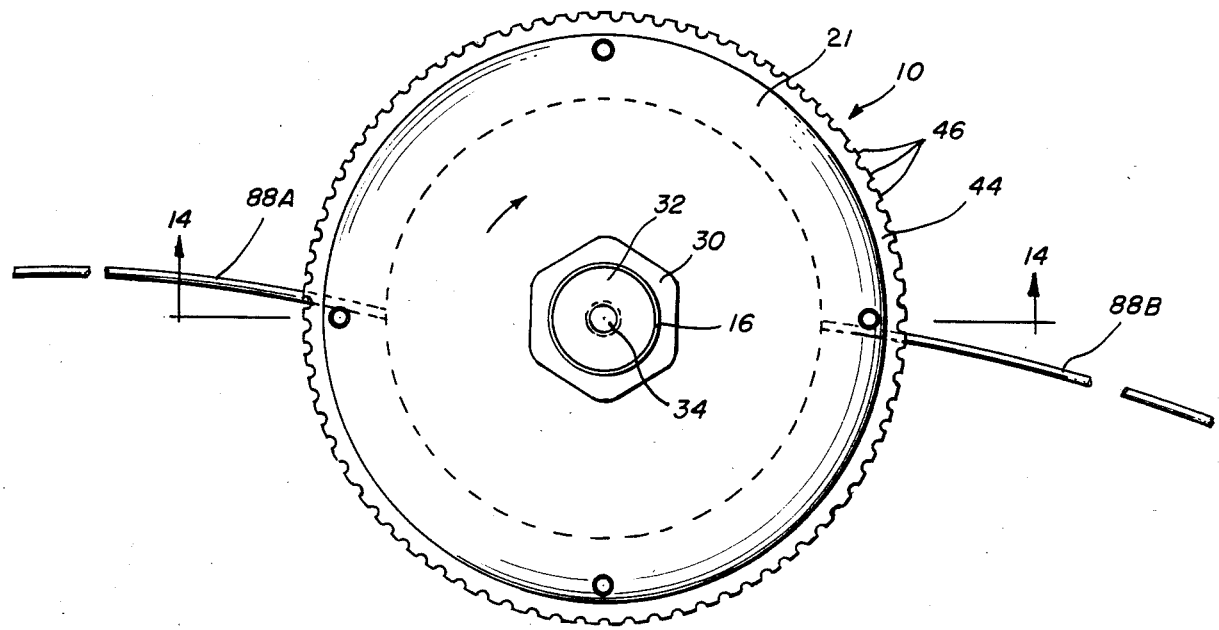
FIG. 4 is a top elevation view showing how the filament spins out during rotation of the cutting head, and also showing how the filament is positioned with respect to the pins.
Figure 5:
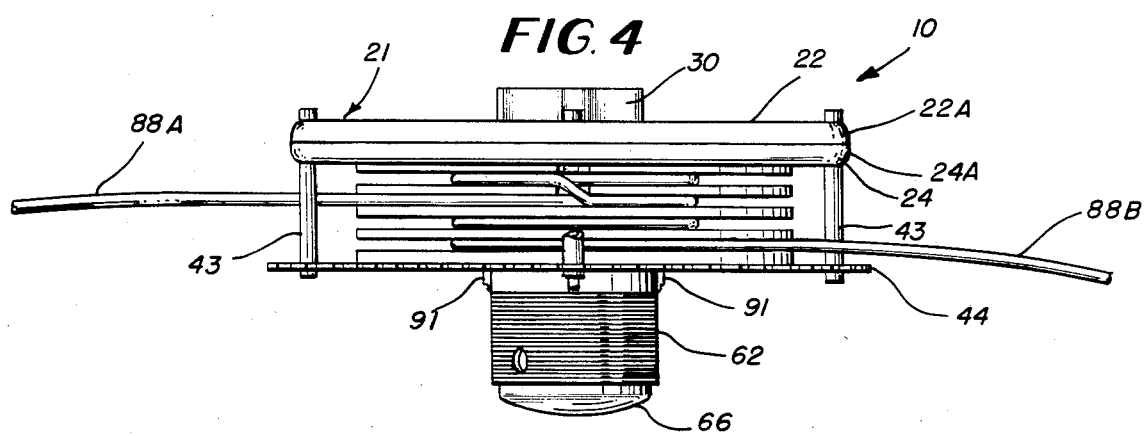
FIG. 5 is a side elevation view of the cutting apparatus of FIG. 1.

As seen in the views of FIGS. 2, 4, and 5, the vertical posts 43 serve as abutments which limit the circumferential swinging movement of the radially outwardly projecting portions of the filaments.

As will be described in more detail hereinafter, cover plate 44 may be provided with saw teeth 46 on the outer periphery thereof for the purpose of cutting thicker vegetation than would normally be cut by the filament type cutter.

As best seen in the view of FIGS. 14 and 17, each of the posts 43 has mounted on the portion of the respective post 43 which lies within the chamber bounded by upper and lower discs 22 and 24 a vibration damping means in the form of a counterweight 48 such as a metal washer. The washers 48 are fitted loosely on the respective posts 43 to provide a substantial clearance between the outer periphery of the respective posts 43 and the inner periphery of the central apertures of the washers which define the vibration damping counterweights.

The vibration damping counterweights 48 defined by the metal washers fitted loosely on the posts 43 can be sized or tuned to respond to a small degree of imbalance or rotational vibration of the cutter head. If there is no imbalance or vibration present, then centrifugal force will merely force the vibration damper counterweights outwardly during the high speed rotation of the cutter head and the rotating system will remain in a steady state condition.

It is difficult for the operator of the rotating cutter head to maintain a constant or exact speed of rotation with varying density of vegetation and unit load, and therefore during the operation of the cutter head, the cutter head rotary speed may be such that it may transitorily pass through the natural vibrating frequency of the rotating mass. When this occurs, the vibration damping counterweights will dynamically react against the temporary natural vibrating frequency by momentarily becoming offset or eccentric with respect to the posts 43 on which they are mounted during one-half of a revolution of the cutter head and then exerting an added force on the posts during the next half revolution. However, until a vibration is induced or exists from external or internal sources the vibration damping counterweights remain dormant or inactive. The external forces which may set up vibrations may be external turning fork type of momentary impact loading or filament imbalance; while vibrations may also be set up by internal natural vibration frequency.

Figure 3:
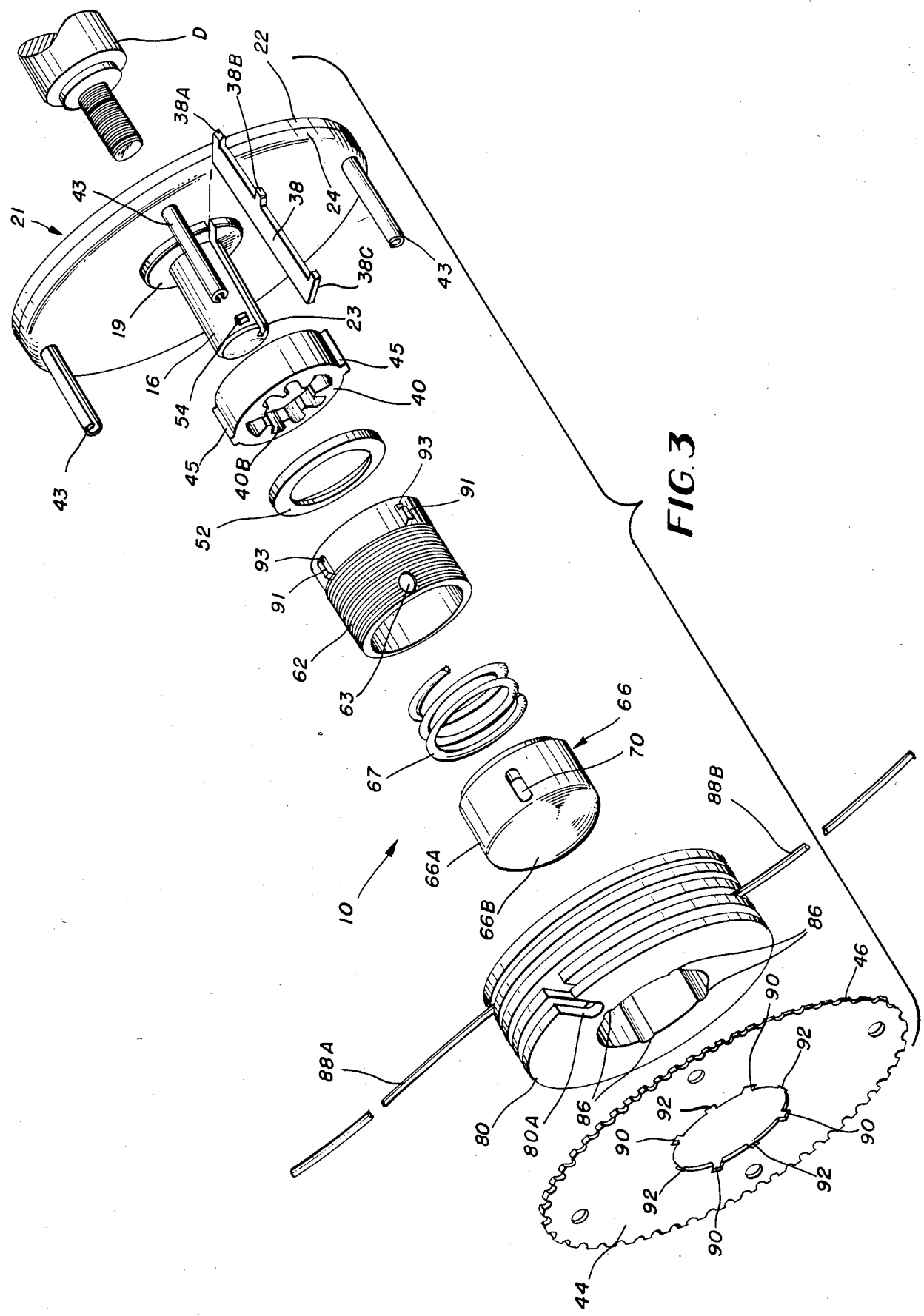
FIG. 3 is an exploded view of the vegetation cutting apparatus.
Figure 10:
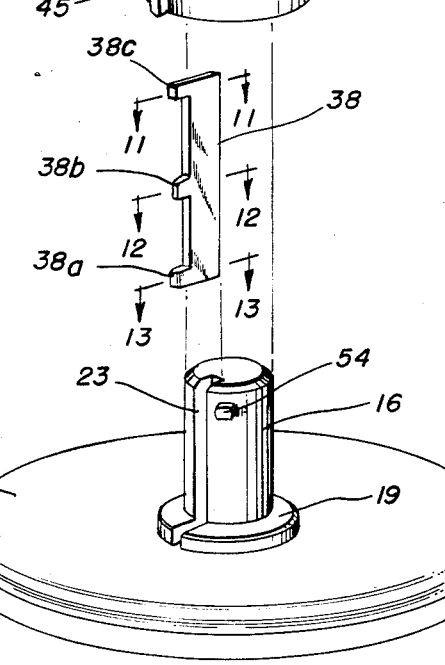
FIG. 10 is an exploded view showing the fourth and final step in the disassembly operation.

As best seen in the view of FIGS. 3 and 10, the sliding key member 38 is provided with three laterally extending key elements respectively indicated at 38A, 38B and 38C which are in spaced relation to each other lengthwise of key member 38. Key elements 38A and 38B are respectively adapted to cooperate with the upper and lower clutch cavities 40A, and 40B, of clutch 40, as will be described in more detail hereinafter. Key element 38C is engaged in annular groove 72 of ground contact plunger 66, to be described, whereby vertical movement of ground contact plunger 66 due to being "bumped" onto the ground causes vertical movement of sliding key 38 whereby to shift sliding key 38 out of driving engagement with upper clutch cavity 40A and into driving engagement with lower clutch cavity 40B, to cause incremental feeding of the cutting filament as will be described in more detail hereinafter.

Coaxially positioned about spindle 16 and sliding key 38 is a clutch wheel 40. Clutch wheel 40 is a hollow cylindrical member having intermediate of its axial height a radially inwardly extending and axially extending annular wall 41. Clutch wheel 40 is provided around the entire internal periphery thereof with a plurality of closely spaced upper clutch wheel cavities 40A lying above annular wall 41; and clutch wheel 40 is also provided around its entire inner periphery with a second set of closely spaced lower clutch wheel cavities 40B which lie below annular wall 41 of the clutch wheel and thus below upper clutch wheel cavities 40A.

During normal operation of cutter head 10, key element 38A of sliding key member 38 is engaged in driving relation with one of the upper clutch wheel cavities 40A due to the downward biasing force imparted to ground contact plunger 66 and to sliding key 38 by axial biasing spring 67. However, as will be explained in more detail hereinafter, when ground contact plunger 66 is "bumped" against the ground surface, key member 38 is moved axially upwardly to disengage key element 38A from one of the upper clutch cavities 40A and to engage key element 38B in driving relation with one of the lower clutch cavities 40B.

Clutch wheel 40 is provided with a pair of diametrically opposite key elements each indicated at 45 which in the illustrated embodiment extend for the entire axial height of clutch wheel 40. Key elements 45 engage corresponding slots 86 in the inner periphery of the annular filament spool 80 whereby to detachably interlockingly engage clutch wheel 40 with filament spool 80 so that filament spool 80 rotates with clutch wheel 40 when clutch wheel 40 is being driven by drive spindle 16 through sliding key member 38.

As best seen in the view of FIG. 16, upper clutch cavities 40A which are shown in full line in FIG. 16 are offset by one-half pitch from lower clutch cavities 40B which are shown in dotted line in FIG. 16. This one-half pitch offset relation of the upper cavities with respect to the lower cavities permits the cutter head 10 to be operated in either a clockwise or in a counterclockwise direction.

In the cross-sectional view of FIG. 16, key element 38A of sliding key 38 which is keyed to spindle 16 is assumed to be rotating in a clockwise direction, as viewed in FIG. 16, along with spindle 16, causing the leading edge of key element 38A, with respect to the direction of rotation, to engage the leading edge 40A-1 of upper clutch cavity 40A, whereby to drive clutch wheel 40, and hence filament spool 80 (to be described) which is keyed to clutch wheel 40, in a clockwise direction as viewed in FIG. 16. Similarly, when sliding key 40 is moved upwardly to move key 40 out of engagement with upper clutch cavity 40A and into a lower clutch cavity 40B, the leading edge of key element 38B, with respect to the direction of rotation, will drivingly engage the leading edge 40B-1 of a lower clutch cavity 40B to drive clutch wheel 40, and hence to drive filament spool 80 keyed thereto, in a clockwise direction as viewed in FIG. 14.

It is important to note that before the upper clutch key element 38A moves out of engagement with the leading edge 40A-1 of the upper clutch cavity 40A in which key element 38A is seated, the lower clutch key element 38B will move into the lower clutch cavity 40B below the upper clutch cavity 40A. However, because the lower clutch cavities 40B are offset by one-half pitch from the upper clutch cavities, the lower clutch key element 38B moves up into the lower clutch cavity adjacent the trailing edge 40B-2 thereof. As soon as the clutch key 38 slides upward for enough for the upper clutch key element 38A to disengage the upper clutch cavity 40A, continued clockwise rotation of the spindle 16 will move the clutch key element 38B forward within the lower clutch cavity 40B until it strikes the leading edge 40B-1 of the lower clutch cavity. The clutch wheel 40 and filament spool 80, once the upper clutch key element 38A disengages the leading edge 40A-1 of the upper clutch cavity 40A, will lag behind the rotating spindle 16 and key 38 until the lower clutch key element 38B moves from adjacent the trailing edge 40B-2 to engage the leading edge 40B-1 of the lower clutch cavity 40B whence positive drive of the clutch wheel 40 and filament spool 80 is re-established through engagement of the lower key element 40B with the leading edge 40B-1 of the lower clutch cavity.

The hollow cap member 21 and the posts 43 will advance clockwise with the spindle 16 relative to the clutch wheel 40 and the filament spool 80 because the cap member 21 is secured to the spindle. Centrifugal force acting upon the filament ends, unwinds the filaments from the spool 80 until the filaments again bear upon the posts 43. The filaments are thus advanced one-half increment.

After the bumping of the plunger 66 upon the ground has forced the key 38 up in the manner just described, the spring 67 which has been compressed by the bumping action of the plunger 66 against the ground, will force the plunger 66 and key 38 downwardly to the fully extended position shown in FIG. 14. Downward motion of the key 38 will cause the upper key element 38A to enter the next succeeding upper clutch cavity 40A' adjacent the trailing edge 40A'-2 thereof, and the lower key element 38B will move out of the lower clutch cavity 40B. Once the lower key element 38B has disengaged the lower clutch cavity, the spindle 16 and key 38 will advance relative to the lagging clutch wheel 40 and spool 80 until the leading edge of the upper key element 38A engages the leading edge 40A'-1 of the upper clutch cavity 40A'. The hollow cap 21 and posts 43 secured therein will thus advance with the spindle 16 and spool 80 for another half increment and the filaments 88A and 88B will unwind from the spool 80 until they again bear upon the posts 43. One full increment of feed of the filaments 88A and 88B is thereby completed.

It is within the scope of this invention to provide a filament cutting element or elements (not shown) within the cutter housing H at appropriate locations to sever frayed ends of the filaments 88. U.S. Pat. No. 4,047,455 illustrates the use of cutter elements to sharpen filaments of a filament-type vegetable trimmer.

An annular retaining ring 52 having the same outer diameter as clutch wheel 40 (not including the dimension added by keys 45 on the clutch wheel) seats against the under surface of clutch wheel 40.

A spring-biased detent assembly generally indicated at 53 is provided contiguous the lower portion of spindle shaft 16, comprising a detent plunger 54 which is received in a laterally-extending cavity 56 best seen in FIGS. 14 and 15 which opens inwardly from the outer periphery of the lower portion of spindle shaft 16. Cavity 56 extends in a direction perpendicular to the vertical axis of spindle shaft 16. A spring member 58 is received in cavity 56 between the inner end of the detent plunger 54 and the inner end of cavity 56 to normally bias plunger 54 in a laterally outward direction to permit the smaller diameter laterally outer end portion 54B of plunger 54 to project through the end opening 60 of cavity 56. Outlet opening 60 is of smaller diameter than the internal diameter of cavity 56 and the inner end portion 54A of plunger 54 is of greater diameter than that of outlet opening 60, whereby to permit only the reduced diameter outer end portion 54A of plunger 54 to extend outwardly through outlet opening 60, and whereby to retain inner portion 54A of plunger 54 in cavity 56.

A hollow cylindrical retaining sleeve 62 seats on the surface of retaining ring 52. Retaining sleeve 62 is open at both opposite ends thereof but is provided at the normally upper end thereof as viewed in FIGS. 14 and 15 with a radially inwardly extending flange 64 which makes the opening at the upper end of sleeve 62 of smaller diameter than the opening at the lower end thereof.

Retaining sleeve 62 receives in the upper portion of the hollow interior thereof a spiral spring member 67 which is for the purpose of biasing ground contact plunger 66 in an axially downward direction. Spring 67 is inserted into retaining sleeve 62 from the normally lower end of sleeve 62, the normally upper end of spring 67 bearing against the under or inner surface of radially inwardly extending flange 64 at the upper end of sleeve 62 as viewed in FIGS. 14 and 15. Cylindrical retaining sleeve 62 is provided with an aperture 63 in the cylindrical wall thereof contiguous the lower portion of sleeve 62, and ground contact plunger 66 is provided with a vertical-slot-like aperture 70. The apertures 63 and 70 of sleeve 62 and of ground contact plunger 66, respectively, are aligned with each other when it is desired to gain access to detent plunger 54 of spindle 16 during the assembly or disassembly operations, as will be described hereinafter.

As best seen in the views of FIGS. 3, 14, and 15, the ground contact plunger generally indicated at 66 comprises a cylindrical body portion 66A and a lower end portion of partially spherical shape 66B. Ground contact plunger 66 has a hollow interior which is bounded at the upper end of cylindrical body portion 66A thereof by an annular bevelled lip 69 which bounds the entrance to the upper end of the hollow interior of ground contact plunger 66.

A short distance below the upper opening of ground contact plunger 66 and beneath the bevelled lip 69, an annular groove 72 is provided in the cylindrical inner wall of plunger 66 to receive key element 38C of sliding key member 38, whereby any vertical movement of ground contact plunger 66, such as movement caused by "bumping" the ground contact plunger 66 on the ground, is communicated to sliding key member 38.

The lower surface of annular groove 72 is bounded or defined by the upper surface 73A of annular rib 73 within the hollow interior of plunger 66. The under or lower surface 73B of annular rib 73 bounds a second or lower annular groove 74 beneath the first or upper annular groove 72 and of substantially greater axial height than upper annular groove 72. Lower annular groove 74 receives the laterally projecting end of detent plunger 54, whereby to interlock ground contact plunger 66 with spindle 66 when spring-biased plunger 54 is in its normally outwardly projected position as seen in FIGS. 14 and 15.

The interlocked engagement of ground contact plunger 66 with spindle 16 by means of the engagement of laterally-projecting plunger 54 carried by spindle 16 with annular groove 74 of plunger 66, and also the mounting of key element 38C in annular groove 72 of ground contact plunger 66 both have the effect of permitting ground contact plunger 66 to slip or rotate independently of spindle shaft 16 if any severe rotational impact forces or movements are imparted to ground contact plunger 66 such as might be caused by impacts of the plunger with the ground surface. The relative rotation capability of ground contact plunger 66 with respect to sliding key 38 and clutch wheel 40 prevents the transmission of such rotational impact forces from ground contact plunger 66 to sliding key 38 and to clutch wheel 40. However, in the absence of such rotational impact forces on plunger 66, ground contact plunger 55 normally rotates with spindle 16 due to frictional drag between key clutch element 38C carried by spindle 16 and receivable in groove 72 of ground contact plunger 66.

Upward movement imparted to ground contact plunger 66 relative to the rest of the assembly, as when ground contact plunger 66 is bumped against the ground surface, transmit the upward move-ment of ground contact plunger 66 to slidable key 38, whereby to move key 38 out of engagement with one of the upper clutch cavities 40A and into engagement with one of the lower cavities 40B, as has been previously described.

Biasing spring 67 is received in the cavity of cylindrical retaining sleeve 62 above ground contact plunger 66 and urges plunger 66 down against spring biased detent plunger 54 carried by spindle 16. More specifically, as seen in FIG. 14, biasing spring 67 normally urges the lower surface 73B of internal annular rib 73 which bounds the annular grooves 72 and 74 down against the upper surface of spring biased detent plunger 54. The cooperative relationship of the parts just described limits the upward movement of ground contact plunger 66 against the lower end of drive spindle 16 to a predetermined vertical movement as defined by the axial height of annular groove 74 in plunger 16, thereby substantially preventing any excessive vertical impact loading being transmitted from ground contact plunger 66 to spindle shaft 16 or to sliding key 38.

In summary, the mounting arrangement of key element 38C in annular groove 72 of ground contact plunger 66, and the relationship of spindle shaft 16, axial biasing spring 67, and ground contact plunger 66 all cooperate to prevent the transmission of excessive rotational and vertical impact forces from ground contact plunger 66 to sliding key 38 or to clutch wheel 40. All excessive vertical impact or rotational impact forces are isolated within ground contact plunger 66 and are not transmitted to sliding key 38 or to clutch wheel 40.

Figure 11:
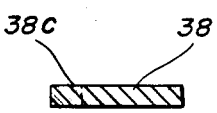
FIGS. 11, 12 and 13 are sectional views taken on lines 11,11, 12,12 and 13,13 respectively through the key element shown in FIG. 10.
Figure 12:
Figure 13:

The filament reel generally indicated at 80 may be generally similar to the filament reel shown in FIGS. 10-12, inclusive, or U.S. Pat. No. 4,250,623 issued on Feb. 17, 1981, to Charles B. Pittinger and Cynthia A. Pittinger. Spool 80 comprises a plurality of annular discs 82 fixed to a central cylindrical hub. In the illustrated embodiment, the filament reel 80 comprises five vertically spaced annular discs 82 lying in parallel planes to define channels 85 between adjacent discs 82. Two separate lengths of filament 88 may be wound on spool 80, including a filament 88A which is wound in the upper group of channels 85 with respect to the view shown in FIG. 3 of the present application and a second filament 88B which is wound in the lower group of channels with respect to the view shown in FIG. 3. Thus, the outer end portions of the two separate filaments 88A and 88B are shown extending radially outwardly of spool 80, the inner ends of each of the respective filaments being received within the interior of one of the corresponding channels 85. The filaments may typically be a suitable monofilament plastic line of nylon or other suitable material.

Each filament 88 is wound in superposed layers or windings within its corresponding channels 85. Each channel has a width as defined by the axial or vertical spacing between adjacent annular discs, only slightly greater than the diameter of the filament which is wound therein, thus preventing successive turns of the filament from being jammed side by side in the channel. The depth of each channel in a radial direction is sufficient to receive a number of superposed turns of the filament 88.

As best seen in the view of FIG. 3 of the present patent application, the two lowermost annular discs are provided with radial slots 80A extending radially inwardly from the circumference of the annular discs for a substantial portion of the radial dimension of the respective discs. The slots 80A lie in a common vertical plane with each other. Also, the upper three annular discs with respect to the view shown in FIG. 3 of the present application are provided with similar radial slots but diametrically opposite the location of the radial slots 80A. The slots such as 80A permit the turns of the filament to be crossed over from one channel to the next adjacent channel.

After the clutch wheel 40, retaining ring 52, retaining sleeve 62, axial biasing spring 67, and ground contact plunger 66 have all been assembled onto spindle shaft 16 in the order shown in the exploded view of FIG. 3, the filament spool 80 may then be positioned coaxially about clutch wheel 40, the filament spool being interlocked in driven relation to the clutch wheel by engagement of two diametrically opposite key ways 86 on the inner periphery of spool hub 80 with respect to diametrically opposite keys 45 carried by the outer peripheral surface of clutch wheel 40.

The final assembly step is to coaxially position the cover plate 44 about the outer periphery of retaining sleeve 62, the plurality of circumferentially spaced notches 90 on the inner periphery of the cover plate being engaged with the similarly circumferentially spaced lugs or abutments 91 which extend from the outer peripheral surface of retaining sleeve 62 in the upper portion of sleeve 62.

Figure 6:
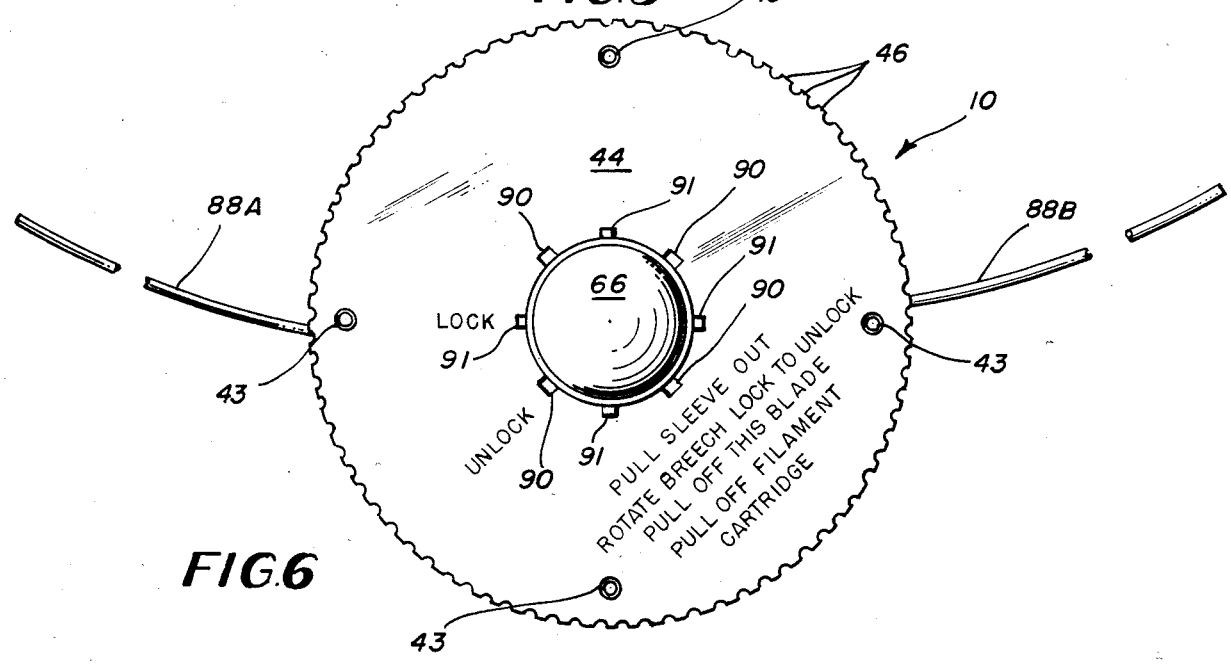
FIG. 6 is a bottom view showing the locking and unlocking arrangement.
Figure 7:
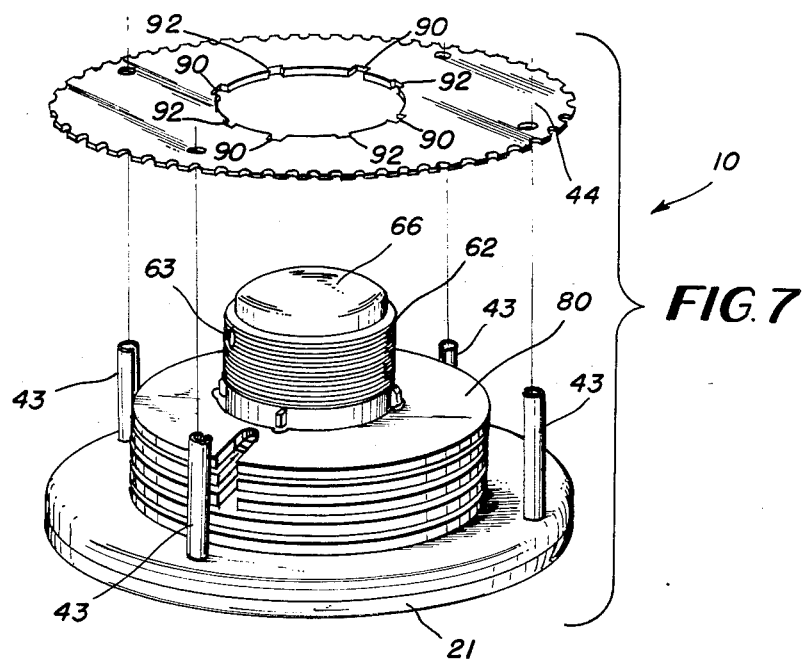
FIG. 7 is an exploded view showing the first step in the disassembly operation.

To retain the parts in the assembled position, the cylindrical retaining sleeve 62 may be pulled axially outwardly against the force of the biasing spring 67 and the cylindrical sleeve 62 is then rotated so that the lugs 91 of the cylindrical sleeve 62 are not in registry with the notches 90 in the cover plate, as best seen in the view of FIG. 6. When the cylindrical sleeve has been rotated to the "Locked" position, it is released, permitting the force of biasing spring 67 to draw the end surface of the cylindrical sleeve up tightly against the abutting surface of the cover plate 44. Circumferentially spaced lock notches 92, of lesser depth than the notches 90, are spaced evenly between the notches 90 on the inner periphery of the cover plate 44. They receive the reduced upper ends 93 of the lugs 91 in the lock position of the sleeve 62 to secure the sleeve against rotation until the sleeve is again deliberately pulled out and rotated to align the lugs 91 with notches 90 for the purpose of disassembly.

In the assembled cutter head, as just described, the biasing spring 67 which biases the ground contact plunger and the sliding clutch key 38 downwardly maintains a constant pressure against the cover plate 44, and the end surfaces of the filament spool 80, thereby providing a dirt and mud seal while providing rotational friction on the filament spool 80, spring 67 additionally becomes a rotational shock absorber to the clutch wheel 40 and clutch key 38. The downward biasing force of spring 67 also compensates for manufacturing tolerances of component parts of the assembly, while simultaneously yielding during clutching and spool filament incremental feeding or rotational advancement.

Cover plate 44 may be provided on the exterior periphery thereof with saw teeth 46. The saw teeth 46 may be used for cutting growth or tree offshoots, such as ½-inch tree offshoots. When the cover plate with the saw teeth thereon is being used for cutting growth as just described, the filaments flex out of the way, permitting the cutting plate saw teeth to perform the cutting operation.

The saw teeth 46 may be of various types such as coarse, fine, etc. It is also within the scope of the invention to use a cover plate 44 having a smooth outer circumference without having any saw teeth thereon.

When it is desired or necessary to replace the filaments or filament reel, this may be easily done without the necessity of disassembling the cylindrical sleeve 62, the ground contact plunger 66, or the sliding clutch key 38 in the following manner:

The cylindrical retaining sleeve 62 is pulled out axially against the pressure of biasing spring 67 and is rotated to align lugs 91 on sleeve 62 with slots 90 in cover plate 44, as best seen in the views of FIGS. 3, 6, 7 and 8. The cover plate may then be pulled over the four mounting posts 43 and removed from the assembly as seen in the disassembled view of FIG. 7 which represents the first step in the disassembly operation.

With the cover plate 44 removed, the filament spool 80 may then be removed from the assembly by simply lifting it upwardly from its already assembled position by sliding the slots or keyways 86 in the inner periphery of the spool 80 up over the lugs 91 on the outer periphery of the threaded sleeve 62. The parts will then be as shown in the exploded view of FIG. 8 which represents the second step in the disassembly operation. Thus, it will be seen from the foregoing that the cutter head assembly is so constructed as to permit easy disassembly of the filament reel 80 for replacement or repair if required.

Figure 8:
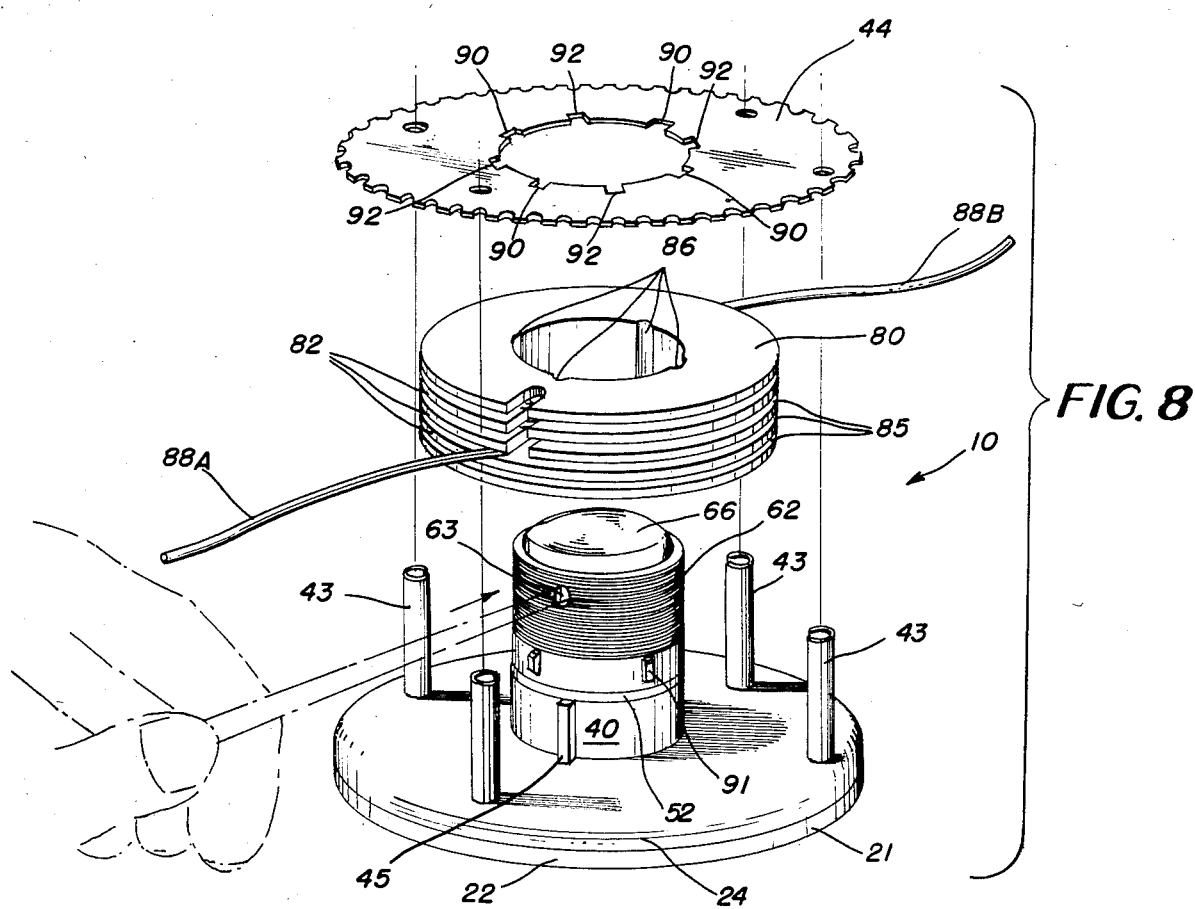
FIG. 8 is an exploded view showing the second step in the disassembly operation.
Figure 9:
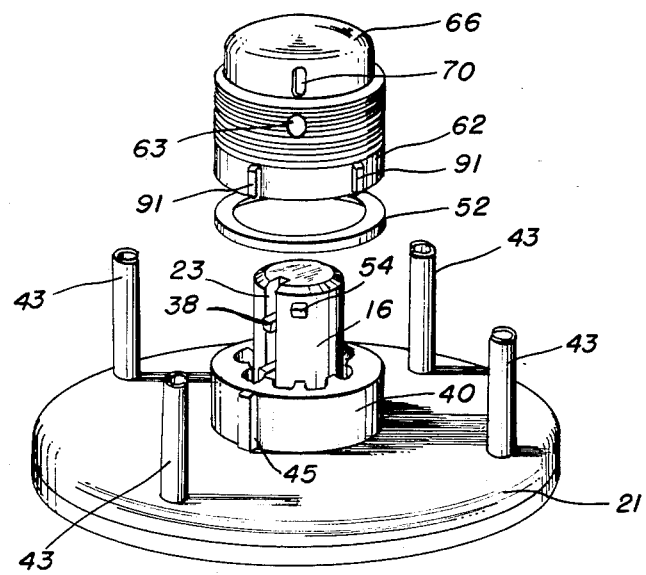
FIG. 9 is an exploded view showing the third step in the disassembly operation.

If it is desired to further disassemble the cutter head to gain access to the other parts of the assembly, such as the spindle 16, the sliding key 38, or the clutch wheel 40, for example, the following additional disassembly steps are performed:

As seen in FIG. 8, the cylindrical sleeve 62 is rotated to align the aperture 63 in the sleeve 62 with the aperture 70 in the side wall of the ground contact plunger 66, and then rotating the cylindrical sleeve 62 and ground contact plunger 66 with their respective apertures 63 and 70 aligned with each other until these apertures are aligned with the spring-pressed detent plunger 54 (see FIG. 14). When this has been done, the end of a nail or the like may then be inserted in the aligned apertures in the sleeve 62 and in the ground contact plunger 66. The detent plunger 54 may then be pushed inwardly against the biasing force of lateral biasing spring 58 to thereby retract plunger 54 from its engagement with the annular groove 74 of ground contact plunger 66, thereby permitting cylindrical sleeve 62 and ground contact plunger 66 to be removed from spindle 16. The sliding key 38 and the clutch wheel 40 will move outwardly with the cylindrical sleeve 62 and the ground contact plunger 66 until the key element 38C of sliding key 38 is disengaged from the internal annular groove 74 of ground contact plunger 66. Clutch wheel 40 can be removed from spindle 16 by again depressing the detent plunger 54 to permit clutch wheel 40 to slide off the end of the spindle 16. The operating parts of the cutter head will then be completely disassembled.

There is shown in the view of FIG. 17 a modified embodiment of the invention in which sliding movement is imparted to the sliding key member by a cable or the like, rather than by use of a ground contact plunger which is "bumped", as previously described.

The cutter head generally indicated at 100 in FIGS. 17 and 18 comprises a spindle member 116 having mounted thereon a hollow cap member 121 which is generally similar to the hollow cap member 21 described in connection with the embodiment of FIGS. 1-16, inclusive. The upper end of spindle 116 is externally threaded as indicated at 128 and an internally threaded nut member 130 threadedly engages the external thread 128 to hold cap member 121 in position. The cap member 121 is provided with apertures 142 for receiving posts 143, and counterweights 148 are mounted on the upper portion of the respective posts 143 within the interior of hollow cap 121, all in a manner similar to the embodiment of FIGS. 1-16, inclusive. The outer wall of spindle 116 is recessed to permit sliding movement of a key member 138 which cooperates with a clutch wheel 140 similar to that described in the embodiment of FIGS. 1-16, inclusive; and a filament reel 180 is keyed to and rotates with the clutch wheel 140, all in a manner similar to that previously described in the embodiment of FIGS. 1-16, inclusive.

Figure 18:
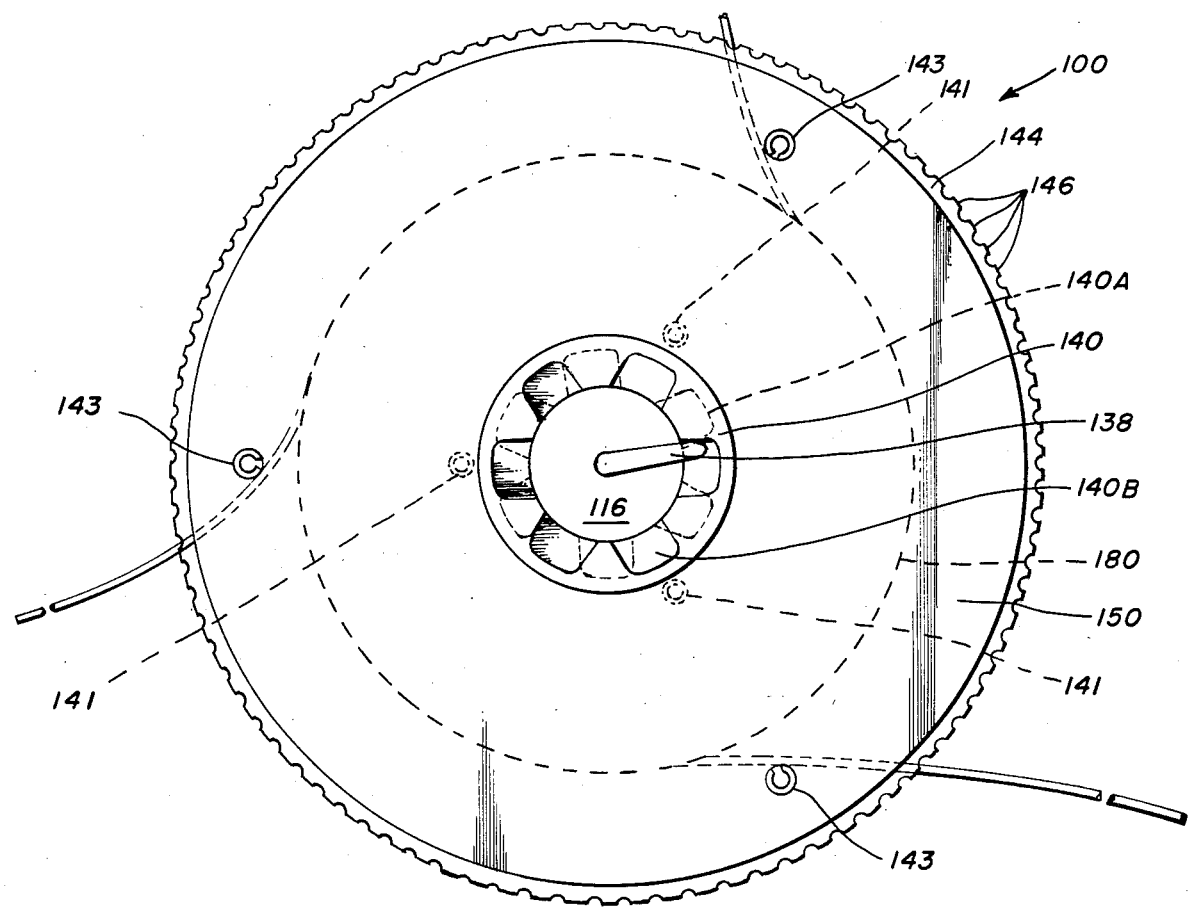
FIG. 18 is a bottom view of the alternative embodiment of FIG. 17.

The modified embodiment of FIGS. 17 and 18 differs from the previously described embodiment in that there is no ground contact plunger 66, no axial biasing spring, no lateral detent subassembly, and no retaining sleeve 62, such as those of the previously described embodiment. Sliding motion is imparted to the sliding key member 138 by means of an operating rod or member 139 which is connected to the sliding key member 138 and extends vertically upwardly through a hollow vertical passage lying along the central vertical axis of spindle 116. The upper end of the rod or extension 139 projects above the upper surface of spindle 116 where it may be connected to a suitable actuating member such as a cable or the like which may be actuated to raise or lower key member 138 to move the upper key element 138A out of engagement with an upper clutch cavity 140A and to cause the lower key element 138B to move into engagement with the lower clutch cavity 140B, in a manner generally similar to the relationship of the key elements 38A, 38B to the clutch cavities 40A, 40B of the previously described embodiment of FIGS. 1-16, inclusive.

The modified embodiment shown in FIGS. 17 and 18 is suitable for use with a cutter head intended for operation in wet marsh ground or the like, where it would be impractical to impart movement to the cutter head by a ground contact plunger such as that described in FIGS. 1-16, inclusive.

Figures 19, 20:
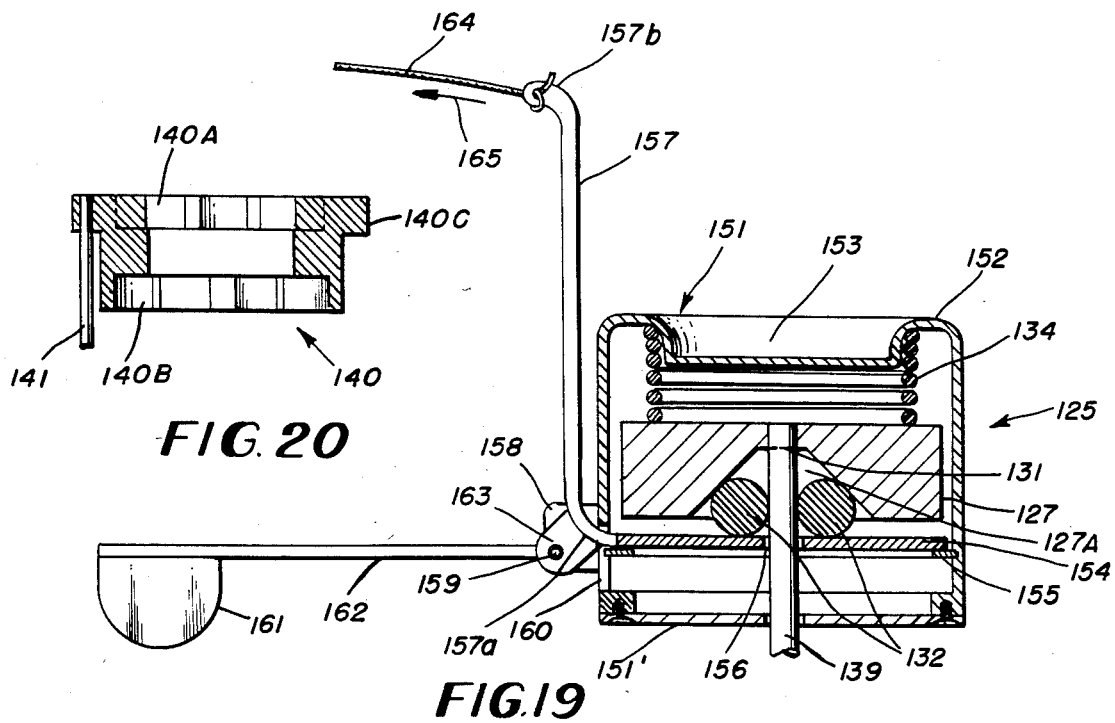
FIG. 19 is a view showing a flyball governor which is used in conjunction with the alternative embodiment of FIG. 17.
FIG. 20 is an enlarged view of the clutch mechanism employed in the alternative embodiments of FIGS. 17-19, inclusive.

There is shown in FIG. 19 a flyball governor arrangement which may be used to impart movement to the sliding key 138 of the cutter head 100 (FIG. 17) to cause incremental feeding of the filament. Thus, the flyball governor arrangement in FIG. 19 is generally indicated at 125 and includes a collar member 127 which is connected to the sliding key member 138 through an operating rod 139. The collar member 127 includes a centrally located recess 127A defined by a conical wall surface 129 which tapers in an inward and upward direction to meet the flat upper surface 131 of the recess or cavity. The upper end of the rod member 139 is secured to the flat upper surface of the cavity in the tapered collar 127. Governor flyballs 132 are positioned in the space between rod member 139 and the tapered surface 129. A biasing spring 134 bears against the top surface of the collar 127.

The fly ball governor 125 also includes a housing 151 comprising a base plate 151' and a dome-shaped cover 152 which has an inwardly deformed hub portion 153 which fits inside the upper end of the coil spring 134 and provides bearing support therefor. The base plate 151 may be removably joined to the domed cover 152 by a screw thread connection or by other suitable means. The fly balls 132 are supported beneath the collar 127 by a circular plate 154 which normally rests in a plane perpendicular to the rod 134 against an annular stop ring 155 fixed inside of the housing 151. The plate 154 has a central hole 156 therein through which the rod 139 slides loosely.

Normally the coil spring 134 acting upon the top of the collar 127 forces the collar 127 downwardly to the position shown in FIG. 19 and the clutch key 138 which is actuated by the clutch key actuating rod 139 will be in the position shown in FIG. 17. When the speed of rotation of the cutter head 100 reaches a predetermined speed, at which centrifugal force acting upon the flyballs 132 in the cavity 127A is sufficient to force the flyballs to move outwardly, the outward movement of the flyballs acting against the conical surface 129 of the collar 127 will lift the collar 127 against the bias of spring 134. The clutch key actuating rod 139 attached to collar 127 will be raised, thereby lifting the clutch key 138. Lifting clutch key 138 disengages the upper clutch key element 138A from the upper clutch cavity 140A in which it has been engaged, and engages the lower clutch key element 138B with a lower clutch key cavity 140B which is angularly offset from the upper clutch key cavity so that the clutch ring 138 and the filament reel 180, which is keyed thereto by posts 141, will shift angularly relative to the rest of the cutter head 100. This angular shifting of the reel 180 relative to the cutter head allows the filaments wound on the reel 180 to feed outwardly an incremental length.

As further shown in FIG. 19, a lever 157 having oppositely curved ends 157a and 157b is pivotally mounted on a bracket 158 fixed outside of the housing cover 152 by a pivot pin 159. The curved end 157a of lever 157 extends through a slot 160 in the housing cover 152 adjacent base plate 151 and is secured to the peripheral edge of the circular plate 154 by suitable means such as by welding. The application of a counterclockwise force (indicated by arrow 165) to the lever 157, as by a pull cord 164 attached to the end 157b of the lever, or by a mass weight 161 attached to an arm 162 extending outwardly from and attached to the lug 163 through which lever 157 is pivoted to bracket 158 will lift the circular plate 154. Lifting of plate 154 lifts the balls 132 with resulting lifting of the collar member 127 and rod 139 which in turn lifts the clutch key 138 of the cutter head 100.

FIG. 25 shows the cutter head 100 of FIGS. 17 and 18 mounted on the body supported cutter drive mechanism similar to the cutter drive mechanism illustrated in FIGS. 1 and 2. The clutch key operating mechanism of FIG. 19 is shown mounted on top of the vertical drive shaft housing 12'. The drive shaft D (see FIG. 17) extends into the housing 12' and is operatively connected with a drive shaft extending through the tube 12 from engine 18 by suitable drive means, such as gearing. It has an axial bore as shown in FIG. 17 for passage of the clutch key operating rod 139 therethrough. A hole (not shown) is provided through the top of casing 12' so that the clutch key operating rod 139 passes through casing 12' into the flyball governor casing 151 in the manner shown in FIG. 19. The flyball governor casing 151 is suitably secured on top of casing 12' by attaching the base plate 151' to the top of casing 12' in any suitable manner as by welding or by use of removable screw fasteners or the like.

While FIG. 19 shows multiple clutch key operating means provided in one assembly, it is within the scope of this invention that any one, any two, or all of the operating means shown in FIG. 19 can be provided for actuating the clutch key 138.

The pull cord and lever as shown in FIG. 19 are for manual actuation of the clutch key whenever the operator wants to renew the cutting portion of the filaments by feeding out incremental lengths of filaments from the spool 180.

The flyball governor 125 is used in situations where automatic incremental feed of the filaments in response to an increased speed of rotation of the cutter head 100 as sensed by the governor 125 is desired.

The mass weight 161 is provided for actuating the clutch key 138 in response to a sudden jerking movement of the cutter head by movement of the handle 14 in a vertical direction causing the mass weight 161 and arm 162 to move downward about its pivot 159 and lifting the plate 154, balls 132, collar 127 and rod 139 against the bias of spring 134.

Instead of using the cutter head 100 of this invention in conjunction with the body carried support arm 12 as in FIG. 25, the cutter head can be attached to the drive shaft of a lawn mower of the gasoline engine, or electric motor driven type which has a wheeled chassis with drive shaft extending downwardly beneath the chasis. Provision would be made for access to the clutch key operating rod so that any one of the three clutch key operating means, or any combination thereof, shown in FIG. 19, could be used to reciprocate the clutch key operating rod 139. The use of a mass weight operator would be especially suitable for use with a four-wheel chassis mounted cutter head so that bumping of the chasis by lifting the front wheels and then bumping them on the ground with a sudden movement will cause the mass weight of FIG. 19 to lift the actuating rod 139 against the bias of spring 134, thus actuating key 138 of head 100 to cause incremental feed of filaments.

FIGS. 21 and 22 show a modified cutter head 10' corresponding to the cutter head 10 disclosed in FIGS. 1-16, with the only exception that the clutch retainer ring 52 has been replaced by a modified clutch retainer ring 52'. The clutch ring 52' includes a first cylindrical ring portion 52a of a diameter which permits it to seat against the under surface of the clutch wheel 40 as shown in FIG. 21, and a second cylindrical ring portion 52b of lesser diameter than the first ring portion 52a. The reduced diameter ring portion 52b is integrally connected to the ring portion 52a by an annular transverse shoulder portion 52c and it extends coaxially outwardly relative to the first ring portion 52a. The diameter of the ring portion 52b is selected so that the ring portion 52b fits loosely inside of the flange 64 of the sleeve 62 and extends coaxially between the coil spring 67 and spindle 16. As shown in FIG. 21, the outer end of the cylindrical ring portion 52b is normally spaced from the upper surface of the lip 69 of ground contact plunger 66 by a distance Z when the ground contact plunger is fully extended. However, when the ground contact plunger is forced upwardly within the hollow sleeve 62 upon impact of the cutter head 10' upon the ground or other hard surface, the outer end of the ring 52' engages the top surface of the ground contact plunger lip 69 at the upper limit of movement of the ground contact plunger 66 as seen in FIG. 22. The frictional contact of the ring 52' with the ground contact plunger 66 serves to transmit forces of relative rotary motion of the plunger 66 to the clutch wheel 40, thereby aiding incremental indexing of the clutch wheel 40 and incremental feed of the filaments 88. The aforesaid assistance to incremental indexing of the clutch ring 52' becomes a critical factor in incremental feeding if the filament lines 88 are short or broken, and rotational speed of the cutter head 10 is low, thereby producing reduced centrifugal force for incremental feeding.

To further explain how the modified clutch retainer ring assists in incremental indexing of the clutch wheel, it will be recognized that during the cutting operation of the cutter head 10', the cutter head 10' will be rotating at a speed corresponding to the speed of rotation transmitted to the spindle 16 by the drive means D illustrated in FIG. 3. Rotary movement of the spindle 16 is transmitted to the filament spindle 80 through the clutch key 38 and clutch wheel 40. Although the ground contact plunger 66 is free to rotate relative to the spindle 16 and clutch key 38 because the only connection of the plunger 66 to the spindle 16 is the sliding connection between tab 38c on the clutch key 38 and the annular groove 72 on the inner face of the hollow plunger 66, the bias of the coil spring 67 on the inner end of the ground contact plunger normally results in sufficient frictional contact between the ground contact plunger and rotating parts of the cutting head 10' to cause rotation of the plunger 66 therewith. However, when the ground contact plunger is bumped upon the ground, frictional contact of the plunger 66 with the ground will momentarily slow or stop the rotation of the plunger 66 relative to the ground. The plunger 66, as a result of the bumping, is forced into the sleeve 62 to the limit of upward motion as shown in FIG. 22. Drag imparted to the clutch wheel 40 through the clutch retainer ring 52', which now has frictional contact with both the clutch wheel 40 and the plunger 66 assists in incremental indexing of the clutch wheel, and corresponding incremental feed of the filaments because the speed of the clutch wheel 40 is slowed while the spindle 16 continues to rotate at approximately the same speed. The filament spool 80 which is keyed to the clutch wheel 40 shifts angular position during incremental indexing relative to the posts 43 against which the filaments 88 bear. Another incremental length of the filaments 88 is thereby permitted to be fed outwardly beyond the posts 43.

FIGS. 23 and 24 show the curved side surfaces of the clutch key elements 138A and 138B of the clutch key 138 of cutter head 100 (FIG. 17). The opposite side surfaces of the upper clutch key element 138A curve inwardly and downwardly to a common bottom edge while the opposite side surfaces of the lower clutch key element curve inwardly and upwardly to a common top edge as seen in FIG. 24. The curved side surfaces of the clutch key elements 138A and 138B provide smooth entry of the clutch key elements into the top and bottom clutch cavities 140A and 140B of the clutch wheel 140 without excessive wear or chipping of the engaging surfaces.

As seen in FIG. 20, the clutch wheel 140 of cutter head 100 differs from the clutch wheel 40 of cutter head 10. It has a radially extending upper flange 140c from which circumferentially spaced posts 141 depend. The posts 141 are press fit into holes provided in the flange 140c, and they slide easily into holes provided adjacent the inner periphery of the spool 180 (FIG. 17) to secure the clutch wheel 140 in assembled relationship with the filament spool 180. The clutch wheel 140 with posts 141 thus provides another way for interlocking a clutch wheel with a filament spool.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

The embodiments of the invention in which an exclusive property or privilege is claimed are defined as follows:

1. A vegetation cutting apparatus of the filament type comprising a cutter head including a spindle adapted to be rotatably driven, a keyway in said spindle extending axially of said spindle, a key member carried by said spindle and slidably movable in said keyway, a clutch means coaxially mounted on said spindle, a spool mounted on said spindle for storing the filament, at least one filament stored on said spool, said spool being carried by and lying radially outwardly of said clutch means whereby said clutch means and said spool rotatably move as a unit, means normally biasing said key member into driving engagement with said clutch means whereby normally said spindle rotatably drives said clutch means through said key member to thereby rotatably drive said spool, means for imparting axial movement to said key member along said keyway against said biasing means whereby to move said key member out of driving relation with respect to said clutch means, and thus whereby to transitorily interrupt the rotatable drive connection from said spindle to said spool through said clutch means, whereby to permit relative rotation between said spool and said spindle, and thus whereby to permit an increment of said filament to be fed by centrifugal force from said spool.

2. A vegetation cutting apparatus as defined in claim 1 in which said spool is easily detachably keyed to said clutch means whereby to facilitate replacement and/or reloading of said spool.

3. A vegetation cutting apparatus as defined in claim 1 in which said clutch means comprises a first plurality of circumferentially spaced upper clutch cavities and a second plurality of circumferentially spaced lower clutch cavities axially positioned beneath said upper clutch cavities, and in which said key member comprises first and second axially spaced key elements, said first key element being normally biased into driving relation with a cavity of one plurality of clutch cavities whereby to rotatably drive said clutch means and thus whereby to rotatably drive said spool, and wherein said axial movement imparted to said key member is effective to transitorily move said first key element out of driving relation with a cavity of said one plurality and to move said second key element into driving relation with a cavity of said second plurality, whereby to rotatably drive said clutch means and thus whereby to rotatably drive said spool.

4. A vegetation cutting apparatus as defined in claim 3 in which said first key element is normally biased into driving engagement with a cavity of said first plurality defined by said upper clutch cavities.

5. A vegetation cutting apparatus as defined in claim 3 in which said upper clutch cavities are circumferentially offset from said lower clutch cavities by a predetermined percentage of a cavity pitch.

6. A vegetation cutting apparatus as defined in claim 5 in which said upper clutch cavities are circumferentially offset from said lower clutch cavities by one-half pitch.

7. A vegetation cutting apparatus as defined in claim 1 in which said means for imparting axial movement to said key member is a ground contact plunger carried by the normally lower end of said cutter head, and means operatively interrelating said ground contact plunger and said key member.

8. A vegetation cutting apparatus as defined in claim 1 in which said means for imparting axial movement to said key member is an operating rod, operatively interrelated with said key member and adapted to be actuated by a cable or the like to axially move said key member whereby to cause feeding of an increment of said filament.

9. A vegetation cutting apparatus as defined in claim 1 in which a flyball governor is connected to said key member to impart movement thereto in response to a predetermined decrease in speed of rotation of said spindle, whereby to cause feeding of an increment of said filament.

10. A vegetation cutting apparatus as defined in claim 1 including vibration damping means carried by said cutter head.

11. A vegetation cutting apparatus as defined in claim 1 including a plurality of circumferentially spaced axially extending posts mounted on said cutter head, at least one of said posts being positioned in the path of circumferential swinging movement of a filament portion extending outwardly from said spool whereby to serve as an abutment limiting the circumferential swinging movement of said portion of said filament.

12. A vegetation cutting apparatus as defined in claim 1 including a hollow generally cylindrical cap member mounted on the normally upper portion of said spindle, said cap member extending radially outwardly from said spindle in overlying relation to said clutch member, to said spool, and to said key member; a plurality of circumferentially spaced posts mounted on said cap member, said posts including a first portion of the length thereof lying within the hollow interior of said cap member and a second portion of the length thereof projecting below said cap member and lying radially outwardly of said spool member.

13. A vegetation cutting apparatus as defined in claim 12 including vibration damping means mounted on said first portion of the length of said posts within said hollow interior of said cap member.

14. A vegetation cutting apparatus as defined in claim 13 in which said vibration damping means comprise counterweights defined by metal washers or the like fitted loosely on said posts to provide a substantial clearance between the outer periphery of the respective posts and the inner periphery of the central apertures of said washers.

15. A vegetation cutting apparatus as defined in claim 1 in which said cutter head includes a cover plate lying beneath said spool, and means detachably securing said cover plate to said cutter head.

16. A vegetation cutting apparatus as defined in claim 15 in which said cover plate is provided with saw teeth on the outer periphery thereof.

17. A vegetation cutting apparatus of the filament type comprising a cutter head including a spindle adapted to be rotatably driven, a keyway in said spindle extending axially of said spindle, a key member carried by said spindle and slidably movable in said keyway, a clutch means coaxially mounted on said spindle, a spool mounted on said spindle for storing the filament, at least one filament stored on said spool, said spool being carried by and lying radially outwardly of said clutch means whereby said clutch means and said spool rotatably move as a unit, said key member being movable into driving engagement with said clutch means whereby normally said spindle rotatably drives said clutch means through said key member to thereby rotatably drive said spool, a ground contact plunger carried by said spindle and engageable with the ground, said ground contact plunger being mounted for limited axial movement relative to said spindle, means interrelating said key member and said ground contact plunger whereby axial movement of said ground contact plunger is imparted to said key member, spring means biasing said ground contact plunger in a normally downward axial direction relative to said spindle to thereby also normally bias said key member in a downward direction into driving engagement with said clutch member, whereby "bumping" movement of said ground contact plunger against the ground is effective to move said key member upwardly against the biasing force of said spring means out of driving engagement with said clutch means, and thus whereby to permit an increment of said filament to be fed by centrifugal force from said spool.

18. A vegetation cutting apparatus as defined in claim 17 in which said spool is easily detachably keyed to said clutch means whereby to facilitate replacement and/or reloading of said spool.

19. A vegetation cutting apparatus as defined in claim 17 in which said means interrelating said key member and said ground contact plunger comprises a follower key element on said key member and an annular groove on said ground contact plunger, said follower key element being mounted in engagement with said annular groove whereby vertical movement imparted to said ground contact plunger due to "bumping" on the ground causes corresponding vertical movement of said key member, and in which the mounting of said follower key element in said annular groove permits said ground contact plunger to slip or rotate independently of said spindle when severe rotational impact forces are imparted to said ground contact plunger.

20. A vegetation cutting apparatus as defined in claim 17 in which said ground contact plunger member is hollow for a substantial portion of the interior thereof and is mounted for limited telescopic movement in an axial direction relative to said spindle member when "bumping" of said ground contact plunger against the ground occurs, and detent means carried by one of said members and engageable with the other of said members to maintain said ground contact plunger member and said spindle member in detachably assembled relation to each other during normal operation and also when said telescopic movement occurs.

21. A vegetation cutting apparatus as defined in claim 20 in which said detent means comprises a lateral plunger member received in a lateral cavity in said spindle member, said lateral cavity extending substantially perpendicularly to the normally vertical axis of said spindle member, laterally extensible spring means positioned in said lateral cavity and cooperating with said plunger member to bias a projectible portion of said plunger member outwardly of said lateral cavity, and additional annular groove means in said ground contact plunger for receiving said projectable portion of said lateral plunger member whereby to retain said ground contact plunger assembled on said spindle.

22. A vegetation cutting apparatus as defined in claim 21 in which said lateral plunger member is retractable against the biasing force of said laterally extensible spring means to retract said projectable portion of said plunger member into said lateral cavity in said spindle member, whereby to withdraw said projectable portion of said plunger member from engagement with said additional annular groove means of said ground contact plunger member, and thus whereby to permit said ground contact plunger member to be disassembled relative to said spindle member.

23. A vegetation cutting apparatus as defined in claim 17 comprising a hollow cylindrical retaining sleeve positioned coaxially about said spindle, said retaining sleeve being positioned about and receiving on the interior thereof said axial biasing spring means, said retaining sleeve receiving the upper portion of said ground contact plunger, said ground contact plunger lying axially beneath said axial biasing spring means, said axial biasing spring means bearing at its upper end against abutment means forming a part of said retaining sleeve, said axial biasing spring means bearing at its lower end against said ground contact plunger, said axial biasing spring means exerting a downward axial biasing force on said ground contact plunger, and detent means detachably engaging said ground contact plunger with said spindle whereby to retain said ground contact plunger detachably mounted on said spindle member.

24. A vegetation cutting apparatus as defined in claim 23 in which said ground contact plunger is provided with a first aperture extending radially through the wall thereof, and said hollow cylindrical retaining sleeve is provided with a second aperture extending radially through the wall thereof, said ground contact plunger and said cylindrical retaining sleeve being angularly adjustable about the axis of said spindle whereby to radially align said first and said second apertures with each other and with said lateral plunger member carried by said spindle, whereby to permit retraction of said lateral plunger member against the force of said laterally extensible spring means into said lateral cavity in said spindle, and thus whereby to permit disassembly of said ground contact plunger member relative to said spindle member.

25. A vegetation cutting apparatus as defined in claim 23 in which said cylindrical retaining sleeve is provided with at least one abutment projecting radially outwardly from the outer periphery of the outer cylindrical surface of said retaining sleeve, said retaining sleeve being angularly adjustable about the axis of said spindle, an annular cover plate detachably mounted on said cutter head beneath said spool in coaxial relation to said spindle, said cover plate being provided on the inner periphery thereof with at least one aperture adapted to mate with and receive said abutment on the outer periphery of said cylindrical sleeve, whereby to permit said cover plate to be coaxially positioned beneath the lower portion of said cylindrical sleeve with said abutment on said sleeve passing through said aperture on said cover plate during the assembly operation of said cover plate on said cutter head, and whereby subsequent to said assembly operation to permit said sleeve to be angularly adjusted to move said abutment on said sleeve out of registry with said aperture on said cover plate whereby to retain said cover plate in assembled relation relative to said cutter head.

26. A vegetation cutting apparatus as defined in claim 17 in which said cutter head includes a cover plate lying beneath said spool, and means detachably securing said cover plate to said cutter head.

27. A vegetation cutting apparatus as defined in claim 26 in which the normally lower axial end surface of said spool abuts against the normally upper surface of said cover plate, and said spring means maintains a constant pressure between said lower end surface of said spool and said upper surface of said cover plate, whereby to provide a dirt and mud seal at the interface between said surfaces.

28. A vegetation cutting apparatus of the filament type comprising a cutter head including a spindle adapted to be rotatably driven, a keyway in said spindle extending axially of said spindle, a key member carried by said spindle and slidably movable in said keyway, a clutch means coaxially mounted on said spindle, a spool mounted on said spindle for storing the filament, said spool being keyed to and lying radially outwardly of said clutch means, means normally biasing said key member into driving engagement with said clutch means whereby normally said spindle rotatably drives said clutch means through said key member to thereby rotatably drive said spool, means for imparting axial movement to said key member along said keyway against said biasing means whereby to move said key member out of driving relation with respect to said clutch means, and thus whereby to transitorily interrupt the rotatable drive connection from said spindle to said spool through said clutch means whereby to permit an increment of said filament to be fed by centrifugal force from said spool, and a circular cover plate mounted on said spindle beneath said spool, said cover plate being provided with saw-like teeth on its outer periphery for cutting heavy growth of vegetation.

29. The vegetation cutting apparatus of claim 1 wherein said spindle has an axial bore extending therethrough, and wherein said means for imparting axial movement to said key member includes a key operating rod slidably mounted in said bore, and means interconnecting said key operating rod with said key member for transmitting axial sliding movement of said key operating rod to axial movement of said key member, and means for imparting axial sliding movement to said key operating rod.

30. The vegetation cutting apparatus of claim 29 wherein said means for imparting axial sliding movement to said key operating rod comprises a pull cord and means interconnecting said pull cord with said key operating rod whereby a pull applied to the pull cord will cause axial movement of said key operating rod and of said key member against said biasing means.

31. The vegetation cutting apparatus of claim 29 wherein said means for imparting axial movement of said key operating rod comprises flyball governor means.

32. The vegetation cutting apparatus of claim 29 wherein said means for imparting axial movement to said operating rod comprises a mass weight and means interconnecting said mass weight with said key operating member whereby the inertia effect of said mass weight in response to a sudden movement thereof will impart axial sliding movement to said operating rod.

* * * * *